(12) United States Patent
Sailer et al.

(10) Patent No.: US 11,492,030 B2
(45) Date of Patent: Nov. 8, 2022

(54) MOBILITY APPARATUS

(71) Applicant: Honda Motor Co., Ltd., Tokyo (JP)

(72) Inventors: Michael T. Sailer, Whittier, CA (US); Mariko K. Schimmel, Rancho Palos Verdes, CA (US); Thomas Mark Abraham, Brooklyn, NY (US); Janet The Planet, Los Angeles, CA (US); Evan Michael Allen, New York, NY (US); Shaye Anna Roseman, New York, NY (US); Nicholas Michael Machesney, Brooklyn, NY (US)

(73) Assignee: Honda Motor Co., Ltd., Tokyo (JP)

( * ) Notice: Subject to any disclaimer, the term of this patent is extended or adjusted under 35 U.S.C. 154(b) by 949 days.

(21) Appl. No.: 16/267,100

(22) Filed: Feb. 4, 2019

(65) Prior Publication Data

US 2020/0247450 A1 Aug. 6, 2020

(51) Int. Cl.
*B62B 3/00* (2006.01)
*B62B 5/00* (2006.01)
*B62B 5/08* (2006.01)
*B62B 5/06* (2006.01)

(52) U.S. Cl.
CPC ............ *B62B 5/0033* (2013.01); *B62B 3/004* (2013.01); *B62B 3/005* (2013.01); *B62B 5/082* (2013.01); *B62B 3/001* (2013.01); *B62B 5/067* (2013.01)

(58) Field of Classification Search
CPC ......... B62B 3/004; B62B 3/005; B62B 3/001; B62B 5/0033; B62B 5/082; B62B 5/067
See application file for complete search history.

(56) References Cited

U.S. PATENT DOCUMENTS

| | | | |
|---|---|---|---|
| 7,004,272 B1 | 2/2006 | Yvonne et al. | |
| 8,596,652 B2 | 12/2013 | Tong et al. | |
| 9,227,650 B2 | 1/2016 | Gillett | |
| 10,646,015 B1* | 5/2020 | Qi | A45C 15/00 |
| 2011/0198136 A1* | 8/2011 | Teague | B62D 51/04 180/19.1 |
| 2018/0022405 A1* | 1/2018 | Gecchelin | B60D 1/481 701/23 |
| 2018/0118243 A1* | 5/2018 | Fitzwater | B62B 7/008 |

FOREIGN PATENT DOCUMENTS

| | | |
|---|---|---|
| CN | 106976515 A | 7/2017 |
| CN | 107650991 A | 2/2018 |
| CN | 207707432 U | 8/2018 |
| EP | 2550890 B1 | 11/2014 |
| JP | 2005096500 A1 | 4/2005 |

* cited by examiner

*Primary Examiner* — Bryan A Evans
(74) *Attorney, Agent, or Firm* — Mark Duell; American Honda Motor Co., Inc.

(57) ABSTRACT

A mobility apparatus includes a frame, a body surrounding the frame having a front side, a rear side, a top side, a bottom side, and first and second lateral sides, a seat located on the top side of the body, a plurality of wheels attached to the frame, a motor for driving at least one of the plurality of wheels attached to the frame, a battery for supplying electricity to the motor, and a controller for directing movement of the mobility apparatus. The top side of the body includes seats for children to ride the mobility apparatus. The mobility apparatus may also include a tether cord or handrails for directing movement of the mobility apparatus, or the mobility apparatus may follow a transmitter or autonomously drive.

14 Claims, 13 Drawing Sheets

MOBILITY APPARATUS

TECHNICAL FIELD

The embodiments disclosed herein are related to the field of mobility apparatuses, and more particularly when used as a portable mobility apparatus for families.

BACKGROUND

Many parents like to take advantage of or expose children to different experiences in cities, downtowns, or large scale shopping areas. The primary goal is to provide opportunities for a family to focus on interacting with one another, and to provide opportunities for additional, previously unplanned destinations (within the city center) to enhance the urban cultural experiences.

However, in order to make the mobility journey a source of excitement for children, new modes of transportation are required. It can be expensive to drive and park in cities, and mass transit is largely a point to point transportation alternative. The solution is to minimize time spent waiting for transportation, and to not make children walk large distances with predictable results.

A need for a family mobility apparatus has been identified that is compact in design, stow able in mass transit, and including power assist motors to make it fun for families to travel further together in a city or urban setting.

Application Summary

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a mobility apparatus includes a frame, a body surrounding the frame having a front side, a rear side, a top side, a bottom side, and first and second lateral sides, a seat located on the top side of the body, a plurality of wheels attached to the frame, a motor for driving at least one of the plurality of wheels attached to the frame, a battery for supplying electricity to the motor, and a controller for directing movement of the mobility apparatus, wherein the controller is operably connected to the motor for controlling driving of the at least one of the plurality of wheels.

According to another aspect, a mobility apparatus includes a frame, a body surrounding the frame, a seat located on the body, a plurality of wheels attached to the frame, a motor for driving at least one of the plurality of wheels attached to the frame, a controller for directing movement of the mobility apparatus, wherein the controller is operably connected to the motor for controlling driving of the at least one of the plurality of wheels, and an autonomous control module operably connected to the controller, the autonomous control module configured to operate the mobility apparatus autonomously.

According to yet another aspect, a mobility apparatus includes a frame, a body surrounding the frame, a seat located on the body, a plurality of wheels attached to the frame, a motor for driving at least one of the plurality of wheels attached to the frame, a controller for directing movement of the mobility apparatus, wherein the controller is operably connected to the motor for controlling driving of the at least one of the plurality of wheels, a tether cord attached to a retractor anchored to the frame of the mobility apparatus, the tether cord being extended through an opening in the body while in use and retracted when not in use, and a handle attached to a distal end of the tether cord and configured to be received in a handle storage recess in the body when the tether cord is retracted.

According to still yet another aspect, a mobility apparatus includes a frame, a body surrounding the frame, a seat located on the body, a plurality of wheels attached to the frame, a motor for driving at least one of the plurality of wheels attached to the frame, a controller for directing movement of the mobility apparatus, wherein the controller is operably connected to the motor for controlling driving of the at least one of the plurality of wheels, a transceiver operably connected to the controller and configured to receive a signal from a remote transmitter, the transceiver including a plurality of sensors, and wherein the controller is configured to process a signal received from the transceiver to determine a position of the remote transmitter relative to the mobility apparatus and to cause the mobility apparatus to move relative to the remote transmitter in accordance with instructions processed by the controller.

Figure 1:
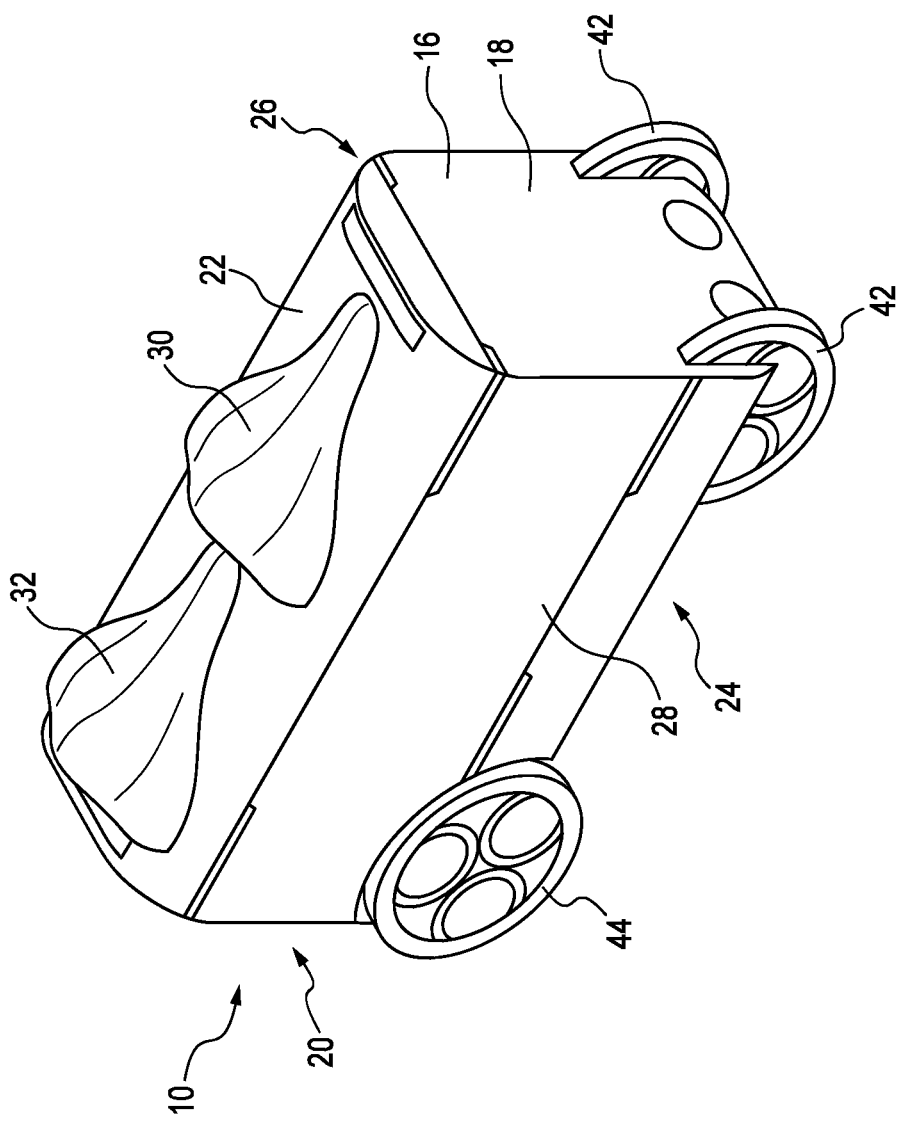
FIG. 1 is front perspective view of one embodiment of a mobility apparatus.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein may be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features which include various vehicle components, systems, and subsystems. Specifically, the term "input device" includes, but it not limited to keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, voice, and/or keyboard) and a processor for computing. Portable devices include, but are not limited to, handheld or wearable devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"User," as used herein can include, but is not limited to, one or more biological beings such as an adult, a child, an infant, or an animal.

Figure 2:
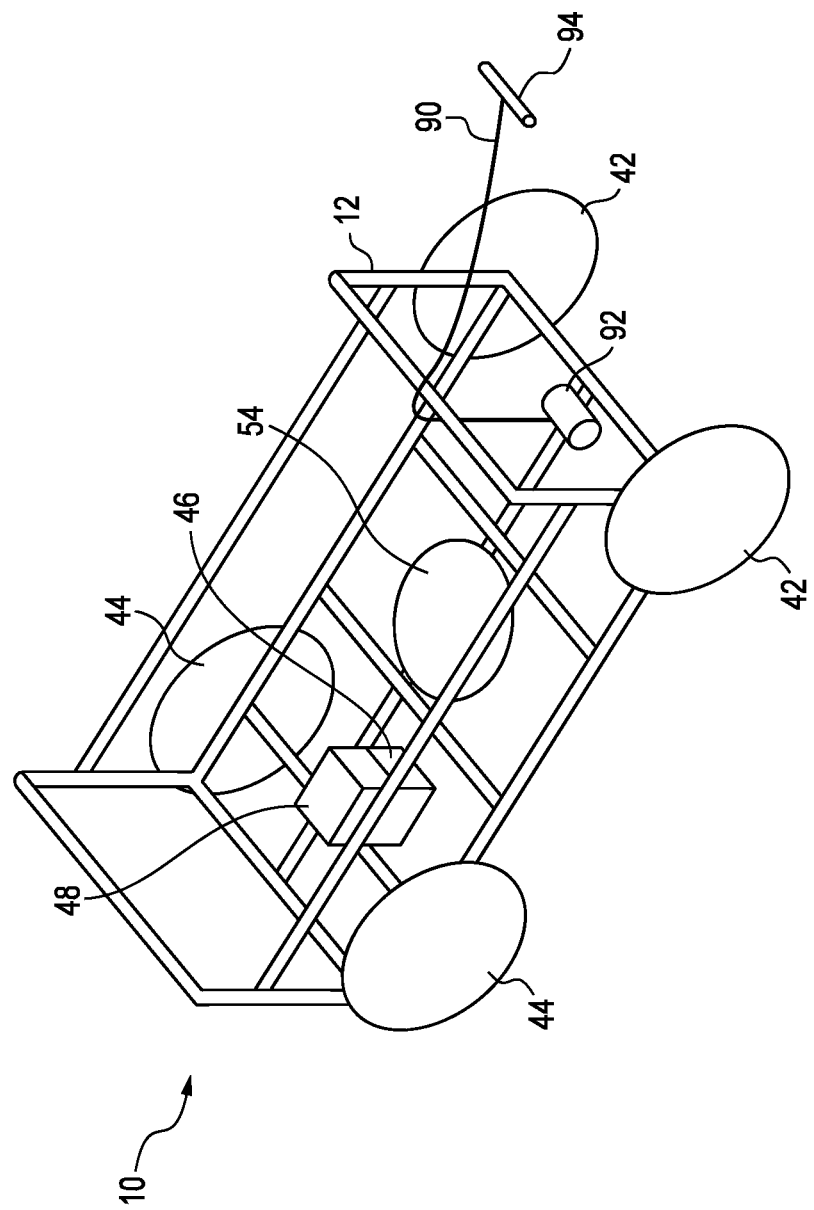
FIG. 2 is a front perspective view of a frame of the mobility apparatus embodying multiple embodiments.

FIGS. 1-2 illustrate an embodiment of a mobility apparatus 10. The mobility apparatus 10 includes a frame 12, illustrated in FIG. 2, which may be constructed of plastic or metal piping welded or melted together. The frame 12 should be sturdy enough to that one or two users 14, typically children, and an adult user 14 may ride the mobility apparatus 10, as illustrated further in FIG. 9, while at the same time maintaining a weight between 22-28 lbs., with a desired target of around 25 lbs. To that end, the frame 12 may be constructed of any sturdy plastics, such as PVC, or lightweight metals, such as aluminum or magnesium, or stainless steel or steel pipes strong enough to maintain structural integrity, but of a significant gauge to achieve the weight targets.

As illustrated in FIG. 1, the frame 12 illustrated in FIG. 2 may be covered by a body 16 surrounding the frame 12 having a front side 18, a rear side 20, a top side 22, a bottom side 24, and first and second lateral sides 26, 28. The body 16 may be constructed of plastic, or any other suitable materials including, but not limited to fiberglass, carbon fiber, metals such as aluminum or magnesium, or any other suitable lightweight material known to those skilled in the art. The body 16, in one embodiment, measures approximately 24 inches long, 10 inches wide, and 16 inches high, which enables the mobility apparatus 10 to be stored in an overhead compartment of an airplane, bus, or other type of public transportation.

As further illustrated, a first seat 30 may be located on the top side 22 of the body 16 on which a user 14 may sit. In the embodiment illustrated in FIG. 1, the mobility apparatus 10 may further include a second seat 32 longitudinally rearward of the first seat 30 on the top side 22 of the body 16. The first and second seats 30, 32 may be constructed of a molded hollow or solid plastic, the seats 30, 32 may be cushioned with a leather or vinyl seat cover, or the seats 30, 32 may be of any other suitable constructions known to those skilled in the art.

Figure 3:
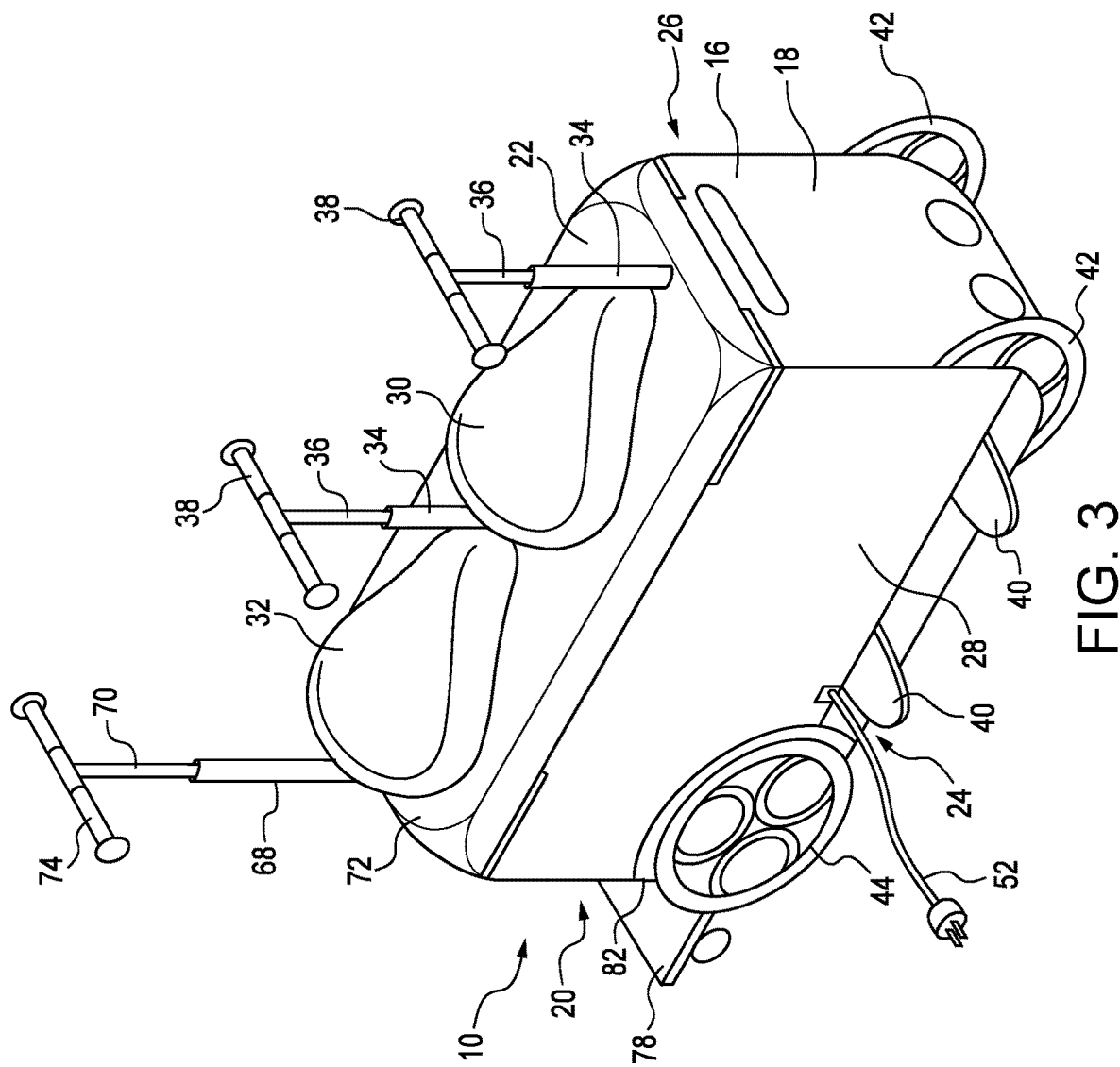
FIG. 3 is front perspective view of an embodiment of the mobility apparatus.

With reference to FIG. 3, in addition to the first and second seats 30, 32, the mobility apparatus 10 may further be equipped with handrails 34 in front of each of the seats 30, 32. The handrails 34 may include a telescoping vertical portion 36 that retracts and extends vertically to and from the top side 22 of the body 16, and a horizontal handle portion 38 that may be held by the child user(s) 14 sitting in the seats 30, 32. Retractable footrests 40 may also be included, extending laterally inward to stow and outward to deploy from a bottom 42 of the first and second lateral sides 26, 28 of the body 16. The footrests 40 may be constructed from the same material as the body 16 and form a portion of the body 16.

The mobility apparatus 10 further may include a plurality of wheels, such as a pair of front wheels 42 and a pair of rear wheels 44, attached to the frame 12 and extending below the bottom side 24 of the body 16 for engaging a surface, such as a concrete sidewalk, asphalt trail, road, floor, or any other surface. While the wheels 42, 44 are designed to operate primarily on a concrete or asphalt surface, the wheels 42, 44 should be durable enough to also operate in light rain, able to navigate through puddles of standing water, and able to provide enough grip with the surface to operate on normal inclines and declines found in urban and suburban neighborhoods.

As illustrated in FIG. 2, a motor 46 for driving the rear wheels 44 is attached to the frame 12 and operably connected to the rear wheels 44. The motor 46 be separate from the rear wheels 44, and connected to the rear wheels 44 via a mechanical linkage through an axle, or the motor 46 may be a brushless wheel hub motor integrated within one of the rear wheels 44 that turns the rear wheel 44 directly and the other rear wheel via a connection, such as a common axle. The motor 46 may be a three-speed electric motor, which may be controlled by a method to be described.

In an alternate embodiment, the front wheels 42 may be driven wheels operably connected to a motor 46, either in addition to or instead of the rear wheels 44 as discussed above. Additionally, any other arrangement of wheels known to those skilled in art may be applied, such as a 3-wheel arrangement with two rear wheels 44 and one front wheel 42 or a 3-wheel arrangement with one rear wheel 44 and two front wheels 42.

Figure 4:
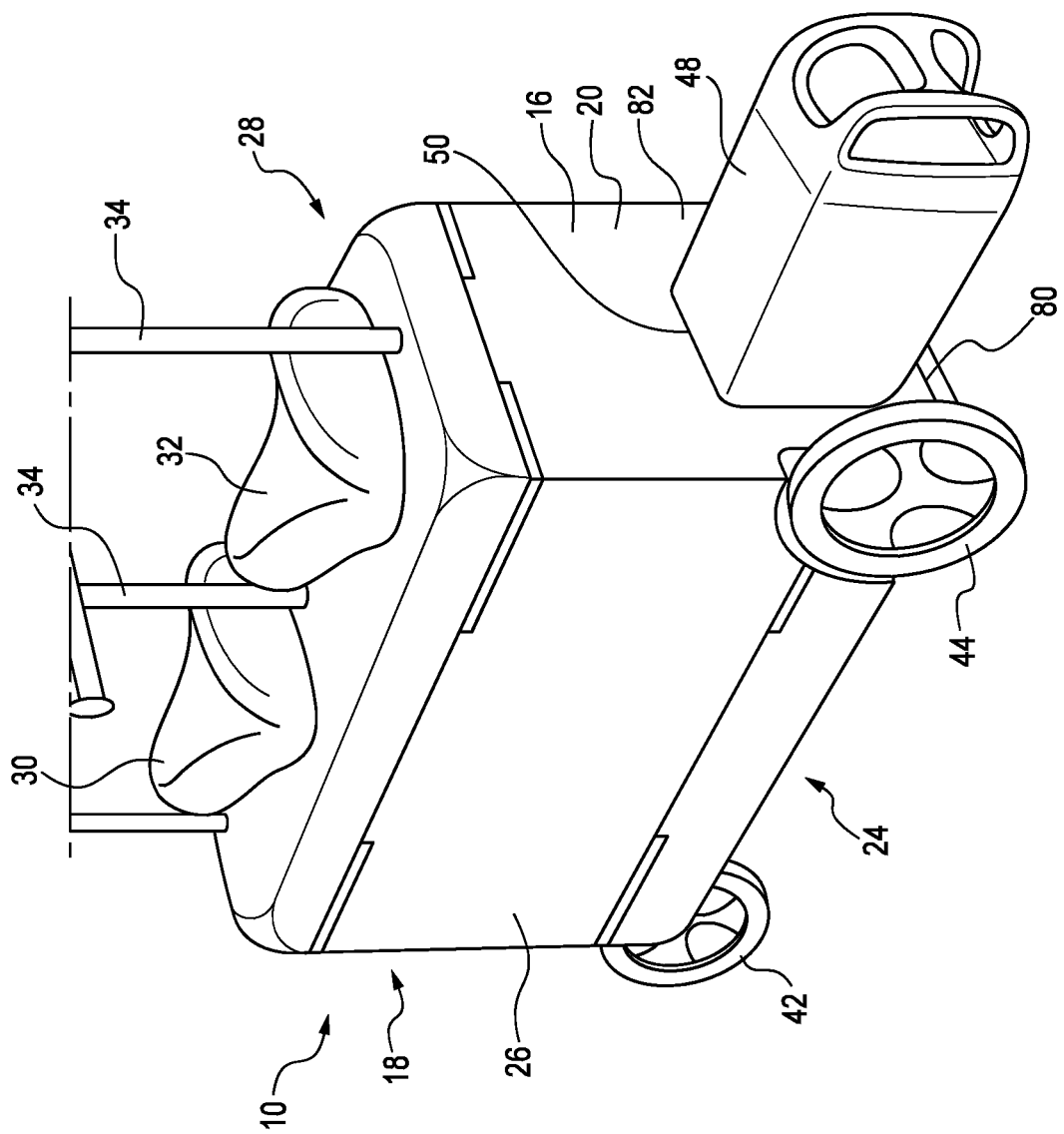
FIG. 4 is a rear perspective view of an embodiment of the mobility apparatus.

The motor 46 may be powered by a battery 48. In the embodiment illustrated in FIG. 4, the battery 48 may be a 1 kW rechargeable battery pack that may be inserted in a compartment 50, the opening of which is located in the rear side 20 of the body 16, for supplying electricity to the motor 46. Additionally, the battery 48 may consist of a plurality of smaller rechargeable battery packs known to those skilled in the art. The battery 48 may be replaced or exchanged by the user 14 while the mobility apparatus 10 is in use, such as through exchange at a store or kiosk. A depleted battery 48 may be exchanged for a charged battery 48.

In an alternate embodiment, the battery 48 may be a rechargeable battery fixed to the frame 12 inside the body 16. In this embodiment, the battery 48 may be recharged by plugging the mobility apparatus 10 into an outlet with either a removable or a retractable dedicated cord 52, as illustrated in FIG. 3.

In yet another embodiment, the mobility apparatus 10 may be equipped with an induction charger 54, shown in FIG. 2, located above the bottom side 24 of the body 16 to recharge the battery 48 via an induction charging system known to those skilled in the art. Any other battery 48 or charging systems known to persons of ordinary skill in the art may also be employed as appropriate.

Figure 5:
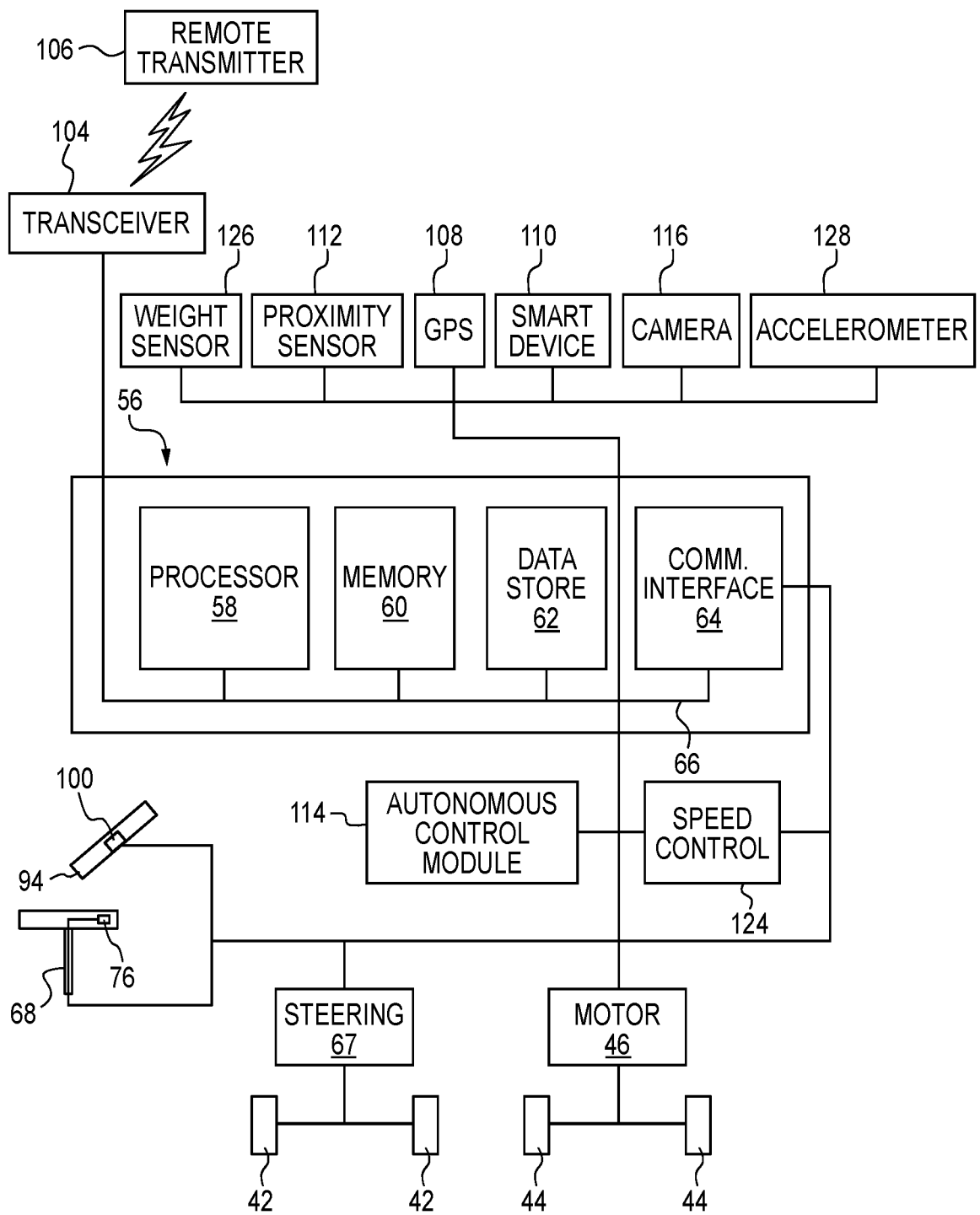
FIG. 5 is a schematic illustration embodying multiple embodiments of controller of the mobility apparatus.

The mobility apparatus 10 may further be equipped with a controller 56, schematically illustrated in FIG. 5, for directing movement of the mobility apparatus 10. The controller 56 includes a processor 58, a memory 60, a data store 62, and a communication interface 64, which are each operably connected for computer communication via a bus 66 and/or other wired and wireless technologies. The communication interface 64 provides software and hardware to facilitate data input and output between the components of the controller 56 and other components, networks, and data sources, which will be described herein. In particular, the controller 56 maintains operable connection with the motor 46 through the communication interface 64 for controlling the driving of the driven rear wheels 44.

Additionally, the controller 56 is operably connected to the steerable front wheels 42. The mechanism 67 for steering the front wheels 42 may be a drive-by-wire steering system that is well known to persons of ordinary skill in the art and is under the control of the controller 56, either autonomously or under commands from an adult user 14.

As illustrated in FIG. 3, a rear handrail 68 may also be included on the mobility apparatus 10. The rear handrail 68 includes a telescoping vertical portion 70 that retracts and extends vertically to and from a longitudinally rearward portion 72 of the top side 22 of the body 16, and a horizontal handle portion 74 that may be held by an adult user 14. The rear handrail 68 may further include sensors 76, shown in FIG. 5, operably connected to the controller 56 for steering and selecting the speed of the mobility apparatus 10 in accordance with methods known to those skilled in the art.

In one embodiment, a retractable rear step 78 may be located in a rear slot 80 in a lower portion 82 of the rear side 20 of the body 16 of the mobility apparatus 10. The rear step 78 may be stow able in the slot 80 in the body 16 retracted, and extended when in use by a user 14. The rear step 78 is constructed from a rigid plastic, steel, stainless steel, or any other suitable material such that it may support the weight of an adult user 14 when in extended, cantilever fashion. The rear step 78 may include stops (not shown) that prevent the rear step 78 from being removed from the rear slot 80 in the body 16 of the type known to those skilled in the art.

Figure 6:
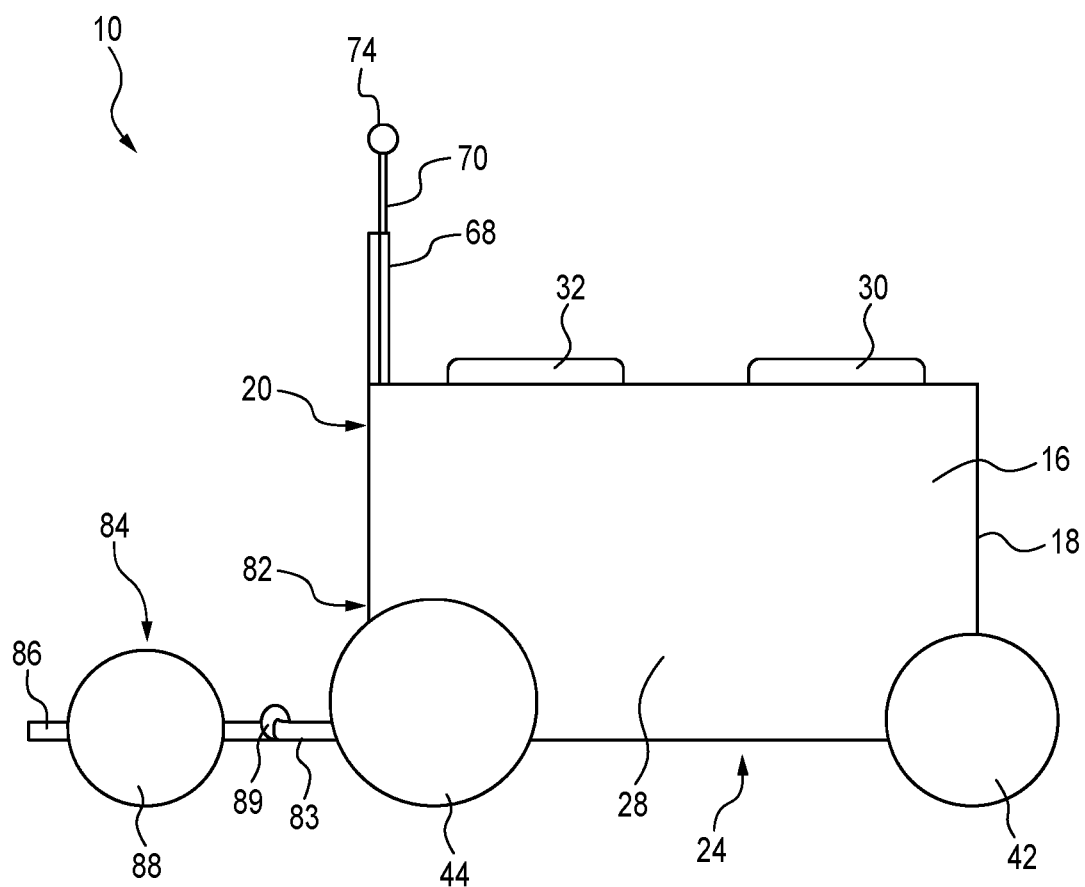
FIG. 6 is a side view of an embodiment of the mobility apparatus with a sulky.
Figure 9:
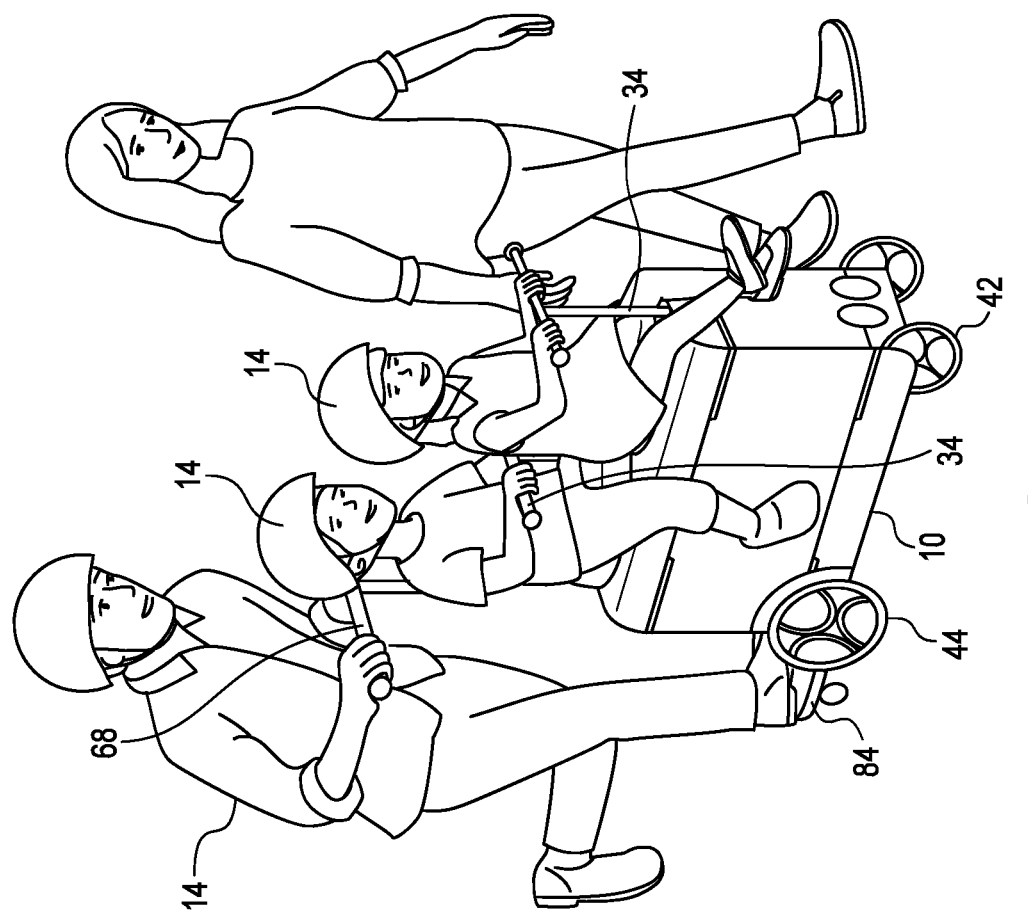
FIG. 9 is a front perspective view of an embodiment of the mobility apparatus with a rear step.

In an alternate embodiment, illustrated in FIG. 6, the mobility apparatus 10 may be equipped with an attachment apparatus 83 at the lower portion 82 of the rear side 20 of the body 16 of the mobility apparatus 10, such as a hitch, a hook, or a bar, for attaching an associated sulky 84. The sulky 84 includes a step 86 constructed from a rigid plastic, steel, stainless steel, or any other suitable material such that it may support the weight of an adult user 14 for riding behind the mobility apparatus 10. The step 86 either is affixed on top of an axle (not shown) supporting two sulky wheels 88 or the sulky wheels 88 are affixed to the step 86 at the lateral edges 88 of the step 86. The sulky 84 further includes an attachment 89 configured to attach the sulky 84 to the attachment apparatus 83 of the mobility apparatus 10. The adult user 14 may stand on the sulky 84 and ride behind the mobility apparatus 10 while holding the rear handrail 68. The adult user 14 may ride or propel the mobility apparatus, as illustrated in FIG. 9

Figure 7:
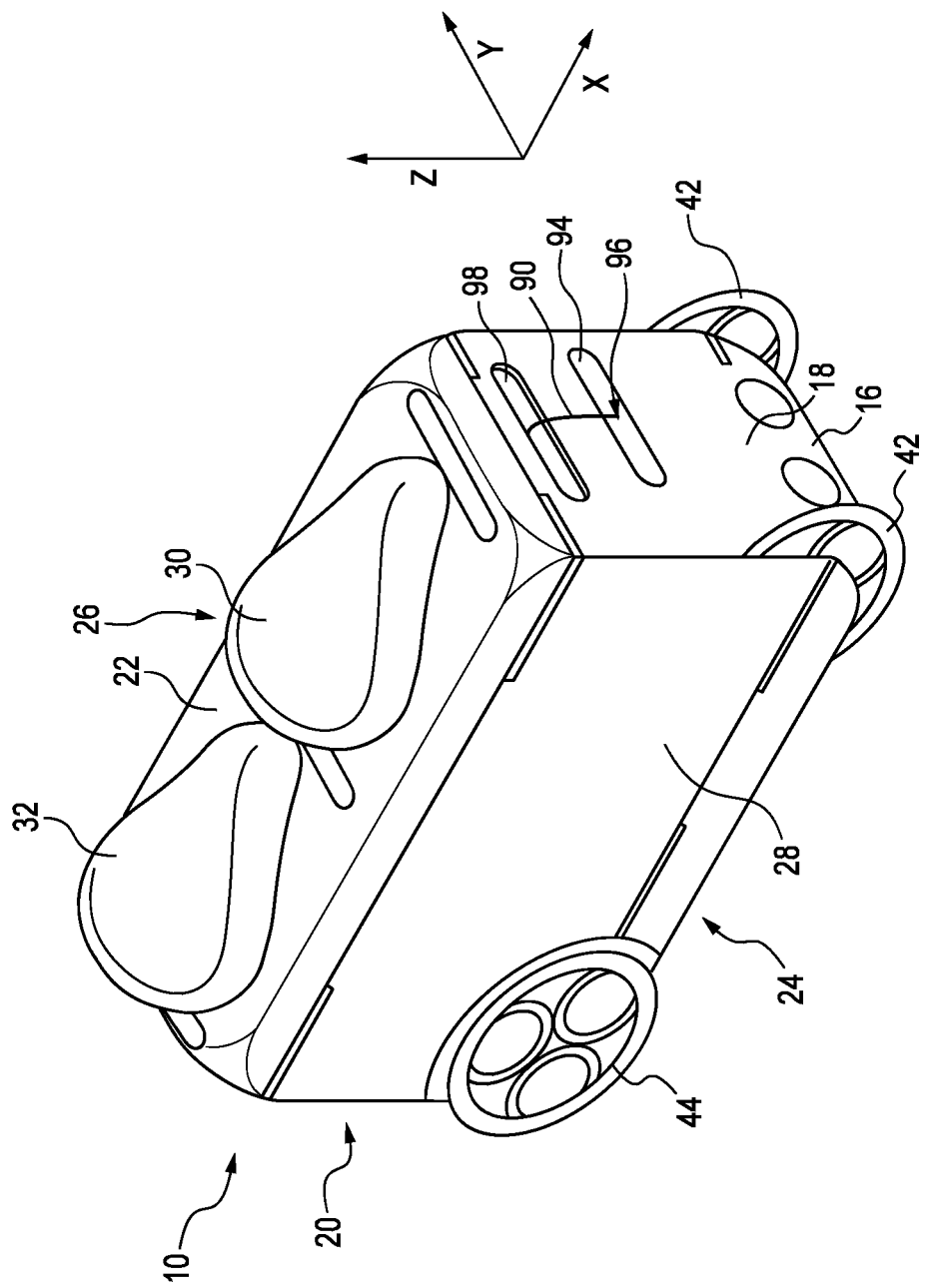
FIG. 7 is a front perspective view of an embodiment of the mobility apparatus with a tether cord.
Figure 8:
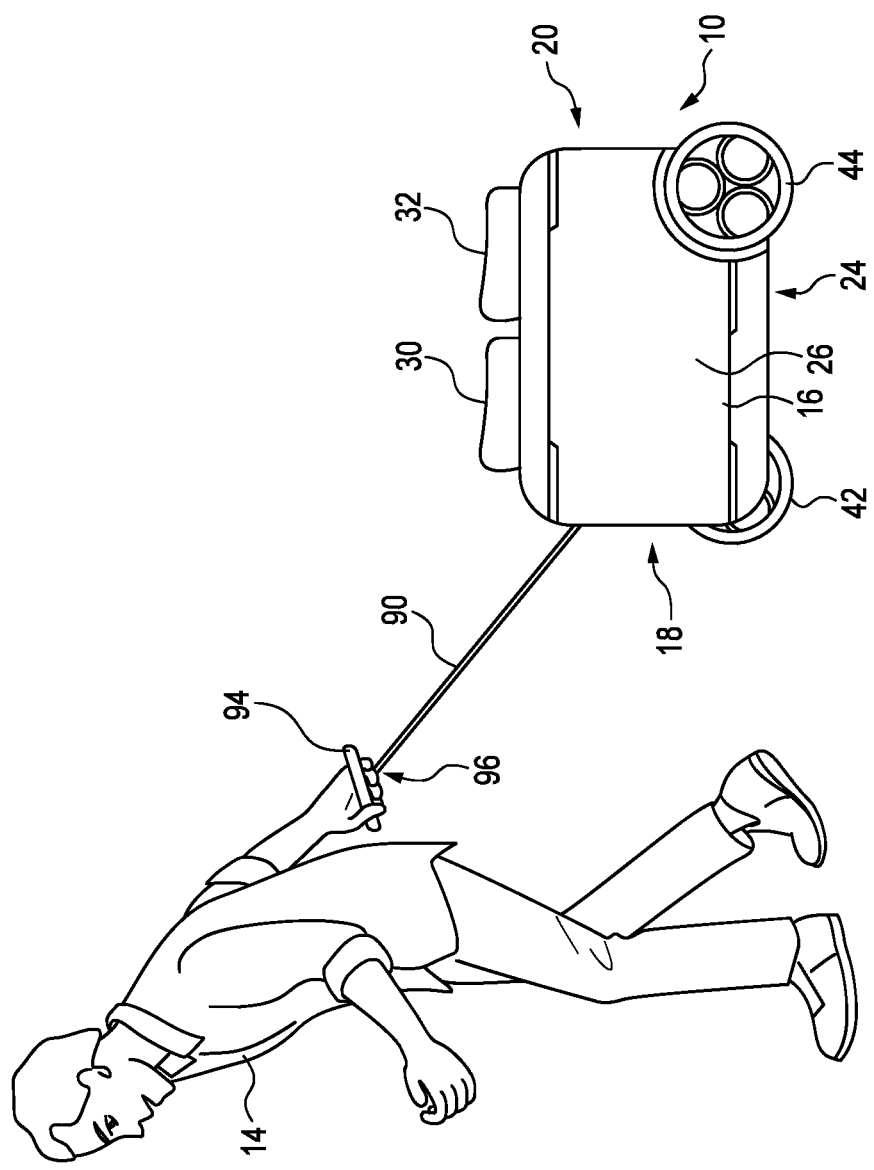
FIG. 8 is a side view of the embodiment of the mobility apparatus with the tether cord.

As illustrated in FIGS. 7-8, the mobility apparatus 10 may also include a tether cord 90 attached to a retractor 92 anchored to the frame 12 of the mobility apparatus 10. The tether cord 90 extends through the front side 18 of the body 16 while in use and retracted when not in use. The tether cord 90 further includes a handle 94 attached to a distal end 96 of the tether cord 90 that is configured to be received and stored in a handle storage recess 98 in the front side 18 of the body 16 when the tether cord 90 is retracted, which prevents the tether cord 90 from retracting inside the body 16 where it would become inaccessible. The mobility apparatus 10 may be pulled by an adult user 14 using the tether cord 90, either with the child users 14 sitting in the seats 30, 32, or without the children sitting on the seats 30, 32, with the front and rear wheels 42, 44 freely rotating as the adult user 14 pulls the mobility apparatus 10 along the surface.

In an alternate embodiment, the tether cord 90 of the mobility apparatus 10 may further be a part of the drive-by-wire system that may be used to steer and control the driving of the mobility apparatus 10. A sensor 100 located in the handle 94 of the tether cord 90 that measures rotation of the handle 94 in an X-Y plane may be used for controlling steering of the mobility apparatus 10. The same sensor 100 may also measure rotation in an X-Z plane to control speed of the mobility apparatus 10 as applied by the motor 46 to the driven rear wheels 44. Alternatively, controls for steering or throttling the motor 46 may be included on the handle 94 in the form of buttons, switches, or touch pads known to persons of ordinary skill in the art. The sensor 100 or controls are in computer communication with the controller 56, either through a wired connection associated with a wire disposed in the tether cord 90 extending from the handle 94 to the controller 56 or wirelessly.

Alternatively, the rear handrail 68 mounted on the frame 14, which is rotatable about a substantially vertical axis may further be a part of the drive-by-wire system that may be used to steer and control the driving of the mobility apparatus 10. A sensor 102 located in the horizontal handle portion 74 of the rear handrail 68 that measures rotation of the horizontal handle portion 74 about the vertical axis may be used for controlling steering of the mobility apparatus 10. The same sensor 76 may also measure rotation of the handrail 68 about a horizontal axis to control speed of the mobility apparatus 10 as applied by the motor 46 to the driven rear wheels 44. Alternatively, controls for steering or throttle for the motor 46 may be included on the horizontal handle portion 74 in the form of buttons, switches, or touch pads known to persons of ordinary skill in the art. The sensor 76 or controls are operably connected to the controller 56, either through a wired connection associated with a wire disposed in the read handrail 68 extending from the horizontal handle portion 74 to the controller 56 or wirelessly.

The controller 56 may include a speed control module 124 that can operate the motor 46 in different speeds related to different modes, such as full assist, hill climb assist, load compensation, etc. In these modes, the output of the electric motor 46 is controlled to maintain the speed of the mobility apparatus 10 for the intended operation. For example, as illustrated in FIG. 9, the adult user 14 may operate the mobility apparatus 10 in a kick and go style (pushing it forward by foot, like a skateboard). The controller 56 may be operably connected to a weight sensor 126 of any type known to persons skilled in the art that may smartly measure the weight of objects and users 14 on the mobility apparatus 10 and add assist to maintain the speed of the mobility apparatus 10 as if the adult user 14 was riding a skateboard. Similarly, the controller 56 of the mobility apparatus 10 in conjunction with an autonomous control module 114 may determine if there is a hill and autonomously add more assist through control of the motor 46 to maintain speed up the hill effortlessly. A hill, for example, may be identified by the controller 56 through an operably connected accelerometer 126 either in the mobility apparatus 10 or an associated smart device 110, based on images from camera 116, data from global positioning apparatus 108, or any other known method.

Figure 10:
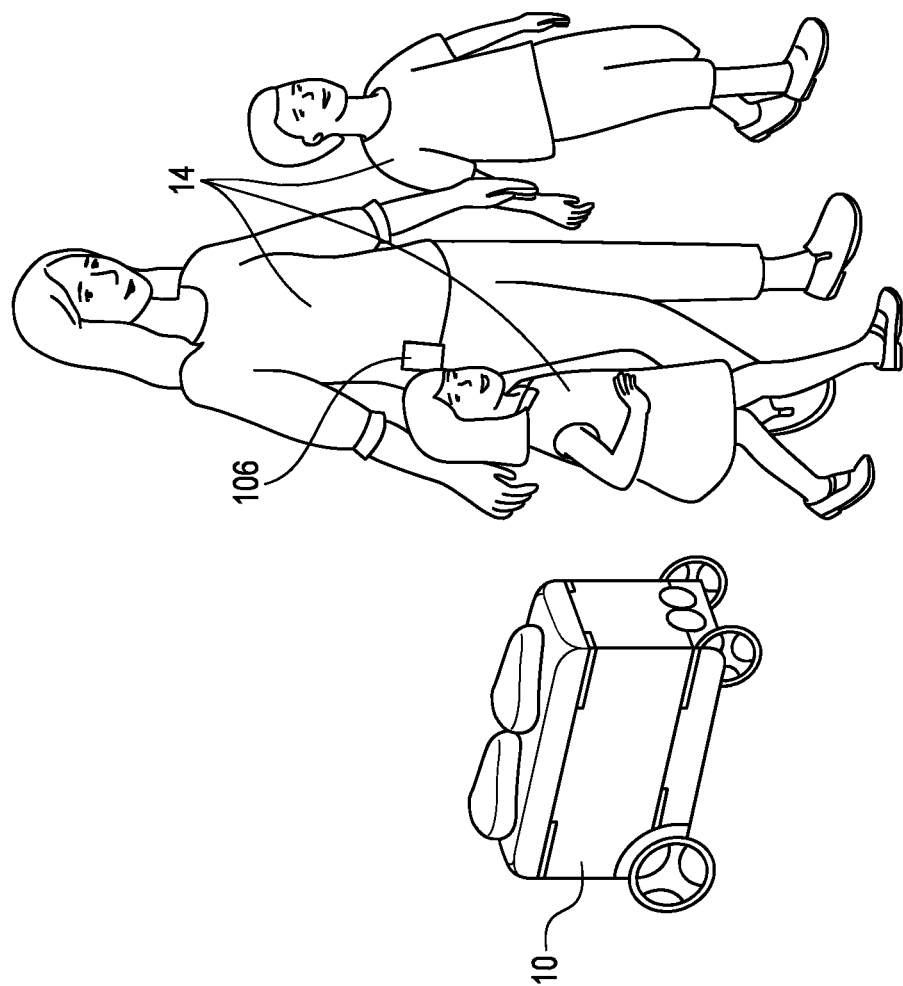
FIG. 10 is a perspective view of an embodiment of the mobility apparatus used with a remote transmitter.

As illustrated in FIGS. 5 and 10, in yet another embodiment, the mobility apparatus 10 may further include a transceiver 104 in computer communication with the controller 56 and configured to receive a signal from a remote transmitter 106 for controlling the operation of the mobility apparatus 10. The remote transmitter 106 may actively send signals to be detected by the transceiver 104. The transceiver 104 may further include a plurality of ultra-wide band bandwidth sensors 108 to prevent the mobility apparatus 10 from running into intervening objects as described below.

When the remote transmitter 106 moves away from the mobility apparatus 10, the controller 56 determines the direction and rate at which the remote transmitter 106 is moving and will control the motor 46 to drive the rear wheels 44 to follow the remote transmitter 106 at a rate and direction equivalent to the movement of the remote transmitter 106. The controller 56 operates to ensure that a predetermined distance will be maintained between the mobility apparatus 10 and the remote transmitter 106. This mode of operation may optionally work in conjunction with the collision avoidance arrangement, and optionally with a global positioning apparatus 108, smart device 110, and/or preprogrammed maps located in the data store 62. As such, if the user 14 having the remote transmitter 106 walks through an area that is unsafe or not accessible or permitted for the mobility apparatus 10, that the mobility apparatus 10 can remain in position until the user 14 moves into a certain range and walks in a permitted and/or safe path for the mobility apparatus 10 to follow, and/or the mobility apparatus 10 can determine and then move along a safe and/or permitted path to the user 14. The programming in the mobility apparatus 10 is designed to take into account the orientation of the mobility apparatus 10 relative to the user 14. For example, the mobility apparatus 10 is about 2-4 feet shorter than the average height of a user 14 (e.g., 5'10"). As such, as the distance between the mobility apparatus 10 and the user 14 varies, the angle of transition between the mobility apparatus 10 and the user 14 constantly changes. The programming in the remote transmitter 106 and/or the controller 56 is generally adapted to account for these distance changes so as to ensure that the mobility apparatus 10 maintains a desired distance from the user 14. Generally, the remote transmitter 106 is capable of operating at about 500-1500 MHz; however, other frequencies can be used. When multiple mobility apparatuses 10 are used on the same area, each of the frequencies of the remote transmitter 106 are generally different so that mutually exclusive channels for the remote transmitter 106 can be used for a different mobility apparatus 10. The remote transmitter 106 can include at least one button and/or switch operable by the user 14 which can allow the user 14 to connect to the mobility apparatus 10; however, this is not required. The remote transmitter 106 can be rechargeable; however, this is not required.

Figure 11:
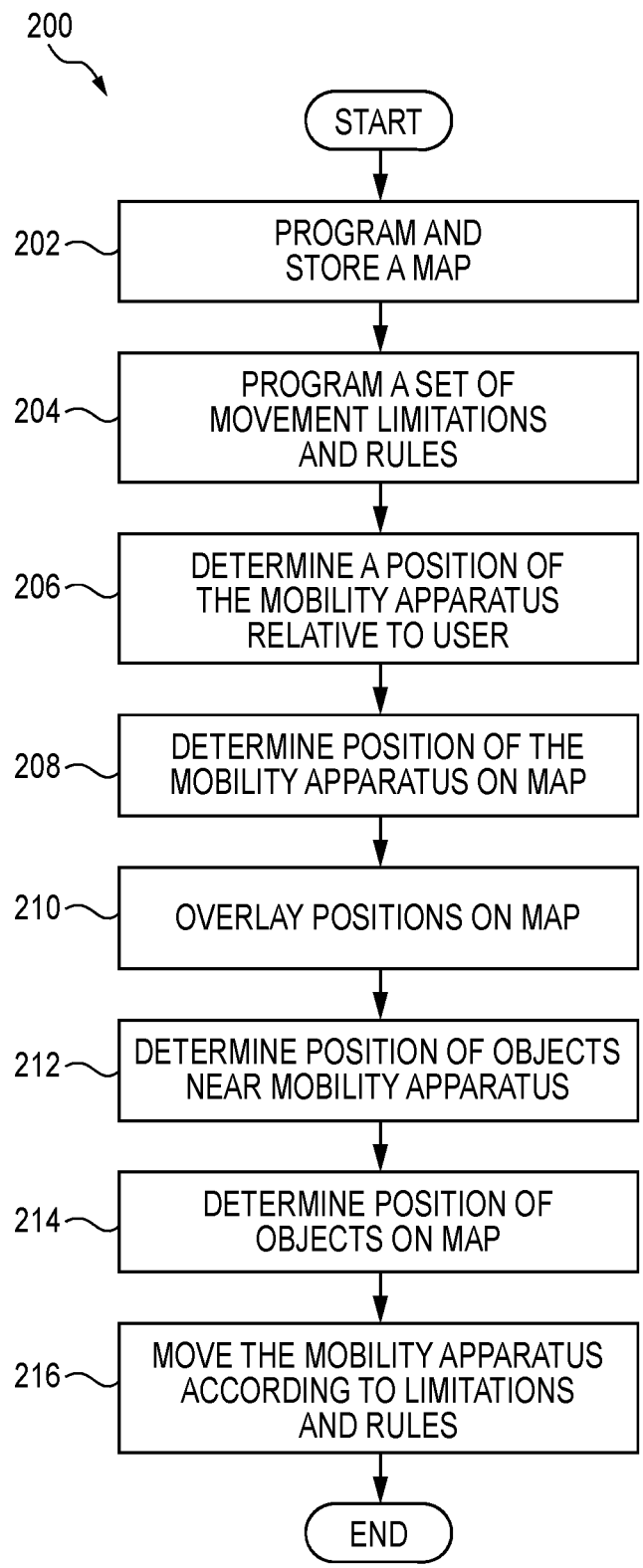
FIG. 11 is a flowchart of method of operation of the mobility apparatus with the remote transmitter.

In operation, the controller 56 of the mobility apparatus 10 can follow the remote transmitter 106 at a defined distance, can sense an impending collision with an object in its path through proximity sensors 112, and can stop prior to a collision by steps of the method 200, illustrated in the flowchart of FIG. 11. The method 200 includes: (1) programming a predetermined map of the area in a computer readable medium stored in the data store 62 of the mobility apparatus 10 (Step 202), (2) programming a set of movement limitations and/or rules for the mobility apparatus 10 in the data store 62 of the mobility apparatus 10 (Step 204), (3) continuously determining a position of the remote transmitter 106 relative to the mobility apparatus 10 as the user 14 moves (Step 206), (4) continuously determining a position of the mobility apparatus 10 via a plurality of proximity sensors 112 and global positioning apparatus 108 (Step 208), (5) overlaying the determined positions of the mobility apparatus 10 on the programmed map (Step 210), (6) continuously determining a position of potential impending objects near the mobility apparatus 10 (Step 212), (7) overlaying the determined position of the potential impending objects on the programmed map (Step 214), and (8) moving the mobility apparatus 10 in accordance with the programmed set of movement limitations and/or rules stored in the memory 60 of the mobility apparatus 10, the determined position of the remote transmitter 106 relative to the mobility apparatus 10, the determined position of the mobility apparatus 10, and/or the determined position of potential impending objects (Step 216).

In still yet another embodiment, the mobility apparatus 10 may include an autonomous control module 114 operably connected to the controller 56. The autonomous control module 114 is configured to operate the mobility apparatus 10 autonomously. Operation of the autonomous control module 114 of the mobility apparatus 10 may be the same as that further described in U.S. patent application Ser. No. 15/910,832 for "Control System for Autonomous All-Terrain Vehicle (ATV)," filed Mar. 2, 2018 and U.S. patent application Ser. No. 15/915,174 for "Autonomous All-Terrain Vehicle (ATV)," filed Mar. 8, 2018, both of which are hereby incorporated by reference in their entirety.

The mobility apparatus 10 may include a camera 116 operably connected to the autonomous control module 114 for supplying data to the autonomous control module 114. The mobility apparatus 10 may also include a global positioning satellite apparatus 108 for determining a position of the mobility apparatus 10 for use by the autonomous control module 114.

Figure 12:
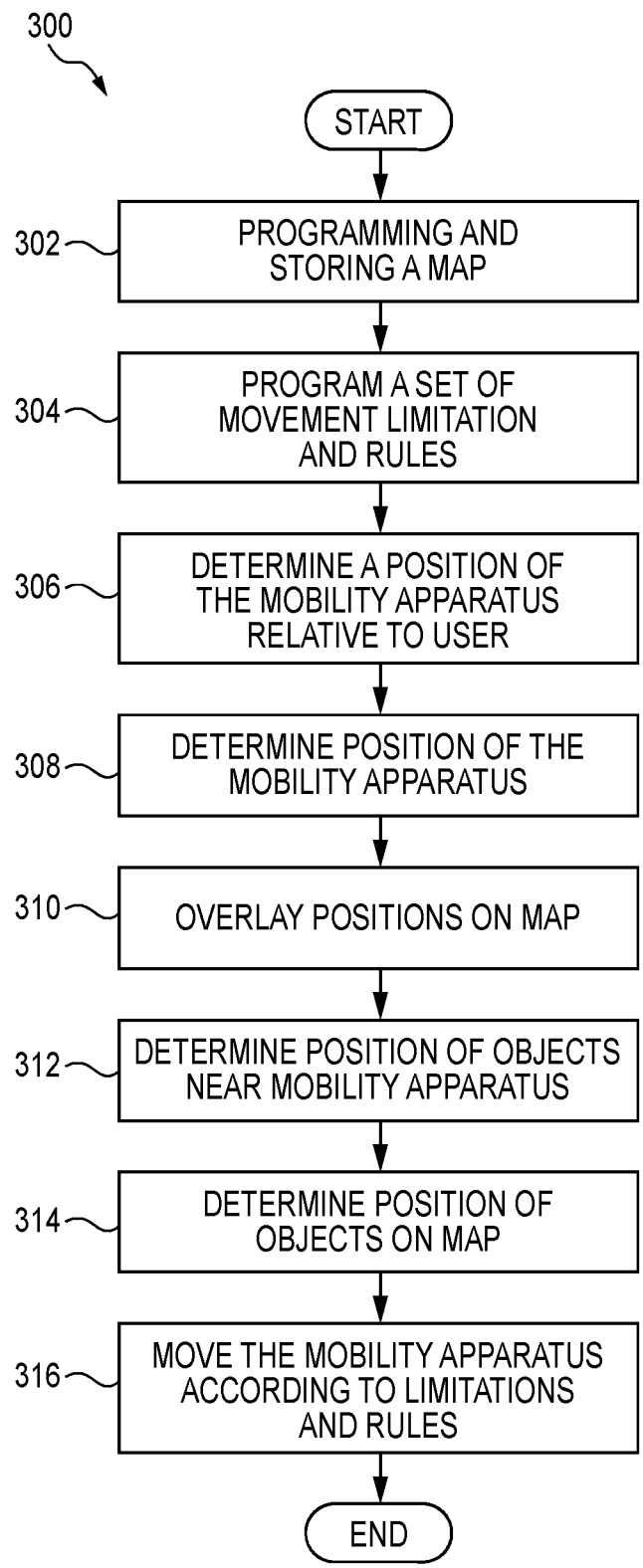
FIG. 12 is a flowchart of method of operation of the mobility apparatus with an autonomous control module.

In operation, the controller 56 of the mobility apparatus 10 can autonomously follow a specified user 14 while maintaining a defined distance or drive to specified location at a defined distance, can sense an impending collision with an object in its path through the sensors 112, including camera 116, and can stop prior to a collision by steps of the method 300 illustrated in the flowchart of FIG. 12. The method 300 includes: (1) programming a predetermined map of the area in a computer readable medium stored in the data store 62 of the mobility apparatus 10 (Step 302), (2) programming a set of movement limitations and/or rules for the mobility apparatus 10 in the data store 62 of the mobility apparatus 10 (Step 304), (3) continuously determining a position of the mobility apparatus 10 relative to the user 14 as the user 14 moves using the camera 116 (Step 306), (4) continuously determining a position of the mobility apparatus via a plurality of proximity sensors 112, the camera 116, or the global positioning apparatus 108 (Step 308), (5) overlaying the determined positions of the mobility apparatus 10 on the programmed map (Step 310), (6) continuously determining a position of potential impending objects near the mobility apparatus 10 via the plurality of sensors 112 (Step 312), (7) overlaying the determined position of the potential impending objects on the programmed map (Step 314), and (8) moving the mobility apparatus 10 in accordance with the programmed set of movement limitations and/or rules stored in the memory 60 of the mobility apparatus 10, the determined position of the user 14 relative to the mobility apparatus 10, the determined position of the mobility apparatus 10, and/or the determined position of potential impending objects (Step 316).

Figure 13:
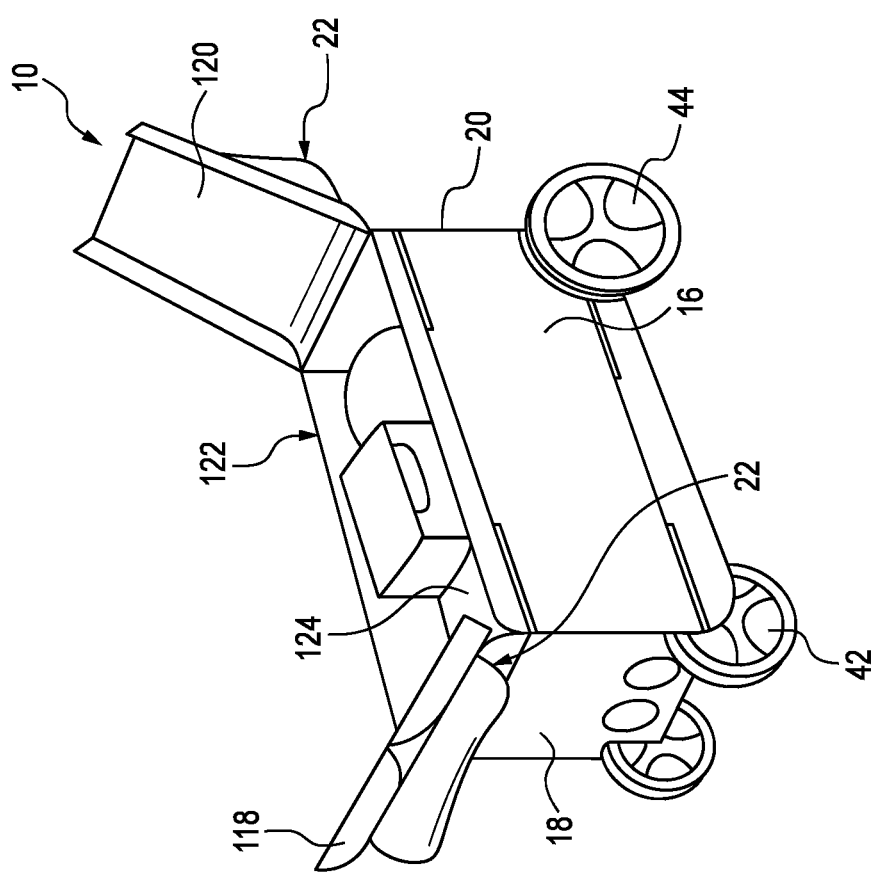
FIG. 13 is a front perspective view of an embodiment of the mobility apparatus with a storage space.

FIG. 13 illustrates a further embodiment of the mobility apparatus 10 in which the top side 22 of the body 16 consists of two hinged lids 118, 120. The rear-hinged lid 120 is connected to the rear side 20 of the body 16, and the front-hinged lid 118 is connected to the front side 18 of the body. The two hinged lids may define a storage space 122 within the body 16, which includes a floor 124 attached to the frame 12 that separates the storage space 122 from the motor 46, retractor 92, battery 48 and the wheel 42, 44 within the body. The hinged lids 118, 120 may be latched or otherwise secured by any method known to one of ordinary skill in the art.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one, more, or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A mobility apparatus, comprising:
   a frame;
   a body surrounding the frame having a front side, a rear side, a top side, a bottom side, and first and second lateral sides;
   a seat located on the top side of the body;
   a plurality of wheels attached to the frame;
   a motor for driving at least one of the plurality of wheels attached to the frame;
   a battery for supplying electricity to the motor; and
   a controller for directing movement of the mobility apparatus, wherein the controller is operably connected to the motor for controlling driving of the at least one of the plurality of wheels, wherein the controller is operably connected to at least one of the plurality of wheels for steering a direction of movement of the mobility apparatus and the controller is operably connected to the least one of the plurality of wheels for steering the direction of movement of the mobility apparatus by a drive-by-wire system;
   a tether cord attached to a retractor anchored to the frame of the mobility apparatus, the tether cord being extended through the front side of the body while in use and retracted when not in use; and
   a handle attached to a distal end of the tether cord and configured to be received in a handle storage recess in the front side of the body when the tether cord is retracted.

2. The mobility apparatus of claim 1 wherein the drive-by-wire system comprises:
   a sensor located in the handle for controlling steering of the mobility apparatus, the sensor is operably connected to the controller; and
   wherein the controller controls operation of the mobility apparatus based on inputs detected by the sensor in the handle.

3. The mobility apparatus of claim 2 wherein the sensor is operably connected to the controller by a wire disposed in the tether cord and extending from the handle to the controller.

4. The mobility apparatus of claim 1 further comprising:
   a steering handle assembly mounted on the frame, the steering handle assembly being rotatable about a substantially vertical axis, the steering handle assembly comprising:
   a steering upright mounted on the frame;
   a steering cross bar mounted on the steering upright toward an upper end of the steering upright and extending laterally from the steering upright; and
   wherein the drive-by-wire system communicates steering instructions from the steering cross bar to the controller.

5. The mobility apparatus of claim 4 further comprising:
   a step movable between a stowed position within the body of the mobility apparatus and an extended position extending longitudinally rearward of the rear side of the body.

6. The mobility apparatus of claim 4 further comprising:
   a sulky attached to the frame and extending longitudinally rearward of the rear side of the body.

7. The mobility apparatus of claim 1 further comprising:
   a transceiver operably connected to the controller and configured to receive a signal from a remote transmitter, the transceiver including a plurality of ultra-wide band bandwidth sensors; and
   wherein the controller is configured to process a signal received from the transceiver to determine a position of the remote transmitter relative to the mobility apparatus and to cause the mobility apparatus to move relative to the remote transmitter in accordance with instructions processed by the controller.

8. The mobility apparatus of claim 7 further comprising:
   a collision avoidance system operably connected to the controller, the collision avoidance system including a plurality of sensors that are configured to detect objects around the mobility apparatus, the collision avoidance system configured to send information to the controller to cause the mobility apparatus to avoid collision or contact with the detected objects.

9. The mobility apparatus of claim 1 further comprising:
an autonomous control module operably connected to the controller, the autonomous control module configured to operate the mobility apparatus autonomously.

10. The mobility apparatus of claim 9 further comprising:
a camera operably connected to the autonomous control module for supplying data to the autonomous control module; and
a global positioning satellite apparatus for determining a position of the mobility apparatus.

11. A mobility apparatus, comprising:
a frame;
a body surrounding the frame;
a seat located on the body;
a plurality of wheels attached to the frame;
a motor for driving at least one of the plurality of wheels attached to the frame;
a controller for directing movement of the mobility apparatus, wherein the controller is operably connected to the motor for controlling driving of the at least one of the plurality of wheels;
a tether cord attached to a retractor anchored to the frame of the mobility apparatus, the tether cord being extended through an opening in the body while in use and retracted when not in use;
a handle attached to a distal end of the tether cord and configured to be received in a handle storage recess in the body when the tether cord is retracted;
a sensor located in the handle for controlling steering of the mobility apparatus, the sensor operably connected to the controller; and
wherein the controller controls operation of the mobility apparatus based on inputs detected by the sensor in the handle.

12. The mobility apparatus of claim 11 wherein the sensor is operably connected to the controller by a wire disposed in the tether cord and extending from the handle to the controller.

13. The mobility apparatus of claim 11 further comprising:
a transceiver operably connected to the controller and configured to receive a signal from a remote transmitter, the transceiver including a plurality of sensors; and
wherein the controller is configured to process a signal received from the transceiver to determine a position of the remote transmitter relative to the mobility apparatus and to cause the mobility apparatus to move relative to the remote transmitter in accordance with instructions processed by the controller.

14. The mobility apparatus of claim 13 further comprising:
a collision avoidance system operably connected to the controller, the collision avoidance system including a plurality of sensors that are configured to detect objects around the mobility apparatus, the collision avoidance system configured to send information to the controller to cause the mobility apparatus to avoid collision or contact with the detected objects.

* * * * *